US011223221B2

(12) United States Patent
Sorace et al.

(10) Patent No.: US 11,223,221 B2
(45) Date of Patent: Jan. 11, 2022

(54) POWER MANAGEMENT (71) Applicant: NXP B.V., Eindhoven (NL)

(72) Inventors: Christian Vincent Sorace, Falicon (FR); Nicolas Patrick Vantalon, Nice (FR); Fabien Boitard, Mouans Sartoux (FR)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/897,732

(22) Filed: Jun. 10, 2020

(65) Prior Publication Data

US 2020/0403431 A1 Dec. 24, 2020

(30) Foreign Application Priority Data

Jun. 18, 2019 (EP) ..................................... 19305774

(51) Int. Cl.
*H02J 7/00* (2006.01)
*H02J 7/34* (2006.01)

(52) U.S. Cl.
CPC ........ *H02J 7/00712* (2020.01); *H02J 7/0068* (2013.01); *H02J 7/345* (2013.01); *H02J 2207/50* (2020.01)

(58) Field of Classification Search
CPC .. H02J 2310/48; H02J 2207/50; H02J 7/0031; H02J 7/00304; H02J 7/00309; H02J 7/0068; H02J 7/00712; H02J 7/345; H02J 9/005; G05B 19/045; B60L 58/14; B60L 58/21; G01R 31/382
See application file for complete search history.

(56) References Cited

U.S. PATENT DOCUMENTS

| | | | | |
|---|---|---|---|---|
| 7,671,560 B2* | 3/2010 | Croman | ................ | H02J 7/0069 320/112 |
| 8,542,059 B2 | 9/2013 | Tejada et al. | | |
| 8,749,425 B1* | 6/2014 | Hu | ...................... | H03M 1/0845 341/172 |
| 9,470,725 B2 | 10/2016 | Hanssen | | |
| 9,537,302 B2* | 1/2017 | Shinde | ..................... | H02H 9/00 |
| 9,595,869 B2* | 3/2017 | Lerdworatawee | .. | H02M 7/4837 |
| 9,730,433 B2* | 8/2017 | Sahin | ..................... | H01L 31/042 |
| 9,806,547 B2* | 10/2017 | Carre | ........................ | H02J 7/00 |
| 9,806,612 B2 | 10/2017 | Zhai | | |
| 10,164,640 B1* | 12/2018 | Lu | .................... | H03K 19/17768 |

(Continued)

*Primary Examiner* — Helen Rossoshek (57) ABSTRACT

A power management circuit includes an electrical power input for receiving electrical power, a controller, a finite state machine circuit in communication with the controller and a first voltage regulator in communication with the controller and the electrical power input and having a first output connected to a first capacitor for storing electrical power and to first electrical circuitry. The controller is configured to cyclically enable the first voltage regulator to supply current to charge the first capacitor. The finite state machine circuit is configured to interact with the controller to control the duration of a first time period of a cycle over which the first voltage regulator supplies current to charge the first capacitor and to control the duration of a second time period of the cycle over which the first voltage regulator does not supply current to charge the first capacitor and during which electrical current is receivable by said first electrical circuitry from said first capacitor.

14 Claims, 7 Drawing Sheets

(56) References Cited

U.S. PATENT DOCUMENTS

| | | | |
|---|---|---|---|
| 2009/0128198 A1* | 5/2009 | Badets | H03K 5/135 |
| | | | 327/107 |
| 2012/0262067 A1 | 10/2012 | Tam et al. | |
| 2014/0176359 A1* | 6/2014 | Hu | H03M 1/0845 |
| | | | 341/172 |
| 2017/0364474 A1* | 12/2017 | Noyes | G06F 13/423 |
| 2018/0054163 A1* | 2/2018 | Chen | H03K 3/011 |
| 2019/0113897 A1 | 4/2019 | Fornara | |
| 2020/0394548 A1* | 12/2020 | Das | H03K 19/195 |

\* cited by examiner

POWER MANAGEMENT

CROSS-REFERENCE TO RELATED APPLICATIONS

This application claims priority under 35 U.S.C. § 119 to European Patent Application No. 19305774.2, filed on Jun. 18, 2019, the contents of which are incorporated by reference herein.

The present specification relates to power management and in particular power management circuitry and methods of operation which can provide low power modes of operation for electronic equipment, devices and apparatus.

Electronic equipment requires a source of electrical power in order to operate. A mains source of electrical power provides a generally limitless supply of electrical power. However, electronic equipment which cannot easily use a mains source of electrical power, for example portable or mobile electronic equipment, may alternatively or additionally have its own local source of electrical power such as one or more batteries.

However, such local sources of electrical power typically may only provide a finite amount of electrical power and therefore may limit the time over which the electrical equipment may be able to operate. This may be exacerbated where the electrical equipment requires relatively high amounts of electrical power, for example to drive an antenna or amplifier, and/or where the electrical equipment is relatively small and hence can only accept a small sized battery.

Power consumption by the electrical equipment can be managed by simply turning the electrical equipment off entirely when not required and turning it back on when required. However, in some circumstances, it may be preferably to maintain at least some functions of the electrical equipment, for example to maintain state information and/or the ability to interact with other electrical equipment and/or to be able to more quickly return to a fully operational state. Hence, some electrical equipment may be provided with the ability to switch between a fully on or awake mode or operation and a sleep or quiescent mode of operation in which only some parts of the electrical equipment may need to consume electrical power.

In order to help manage power consumption low power modules have been designed such as low quiescent current bandgap regulators, low power hysteretic regulators or low power linear regulators.

However, it would be beneficial if even lower levels of electrical power consumption could be achieved.

According to a first aspect of the present disclosure, there is provided a power management circuit comprising: an electrical power input for receiving electrical power from a power source; a controller; a finite state machine circuit in communication with the controller; and a first voltage regulator in communication with the controller and the electrical power input to receive electrical power and having a first output connectable to a first capacitor for storing electrical power and connectable to first electrical circuitry wherein the controller is configured to cyclically enable the first voltage regulator to supply current to charge the first capacitor and wherein the finite state machine circuit is configured to interact with the controller to control the duration of a first time period of a cycle over which the first voltage regulator supplies current to charge the first capacitor and to control the duration of a second time period of the cycle over which the first voltage regulator does not supply current to charge the first capacitor and during which electrical current is receivable by said first electrical circuitry from said first capacitor.

In one or more embodiments, the power management circuit may further comprise a second voltage regulator in communication with the controller and the electrical power input to receive electrical power and having a second output connectable to a second capacitor for storing electrical power and connectable to second electrical circuitry, wherein the controller is configured to cyclically enable the second voltage regulator to supply current to charge the second capacitor and wherein the finite state machine circuit is configured to interact with the controller to control the duration of the first time period of a cycle over which the second voltage regulator supplies current to charge the second capacitor and to control the duration of the second time period of the cycle over which the second voltage regulator does not supply current to charge the second capacitor and during which electrical current is receivable by said second electrical circuitry from said second capacitor.

In one or more embodiments, said first capacitor may store electrical power and may be arranged to supply electrical power for powering analog electrical components and said second capacitor may store electrical power and be arranged to supply electrical power for powering digital electrical components.

In one or more embodiments, the power management circuit may further comprise: a reference voltage circuit in communication with the controller and the electrical power input to receive electrical power and having a third output connectable to a reference voltage capacitor for storing electrical power, wherein the controller may be further configured to cyclically enable the reference voltage circuit to supply current to charge the reference voltage capacitor and wherein the finite state machine circuit is configured to interact with the controller to control the duration of the first time period of a cycle over which the reference voltage circuit supplies current to charge the reference voltage capacitor and to control the duration of the second time period of the cycle over which the reference voltage circuit does not supply current to charge the reference voltage capacitor.

In one or more embodiments the power management circuit may further comprise a low frequency oscillator in communication with the controller and the finite state machine circuit, and wherein the finite state machine circuit is configured to control the duration of the first time period based on the number of cycles of the low frequency oscillator.

In one or more embodiments, the finite state machine circuit may include a first programmable register and wherein a value set in the first programmable register is used to determine the duration of the first time period.

In one or more embodiments, the finite state machine may be further configured to control the control the duration of the second time period based on the number of cycles of the low frequency oscillator.

In one or more embodiments, the finite state machine circuit may include a second programmable register and wherein a value set in the second programmable register is used to set the duration of the second time period.

In one or more embodiments, the power management circuit may further comprise a first voltage monitor in communication with the first output and the finite state machine circuit, wherein the first voltage monitor is configured to output a first indication of the voltage of the first capacitor and wherein the finite state machine circuit is further configured to control the duration of the second time period based on the first indication of the voltage of the first capacitor.

In one or more embodiments the power management circuit may further comprise a second voltage monitor in communication with the second output and the finite state machine, and wherein the second voltage monitor is configured to output a second indication of the voltage of the second capacitor and wherein the finite state machine circuit is further configured to control the duration of the second time period based on the second indication of the voltage of the second capacitor.

The finite state machine circuit may be further configured to control the duration of the second time period based on the first indication indicating that the voltage of the first capacitor has fallen below a threshold level or the second indication indicating that the voltage of the second capacitor has fallen below a threshold level.

According to a second aspect of the present disclosure, there is provided a package including a semiconductor integrated circuit, wherein the semiconductor integrated circuit is configured to provide the power management circuit of the first aspect.

According to a third aspect of the present disclosure, there is provided an electronic apparatus including the power management circuit of the first aspect or the package of the second aspect. The electronic apparatus may further comprise a power source connected to the electrical power input, a first capacitor connected to the first output and first electrical circuitry connected to the first output. The electronic apparatus may further comprise a second capacitor connected to the second output and second electrical circuitry connected to the second output. The first electrical circuitry may be analog electrical circuitry and/or the second electrical circuitry may be digital electrical circuitry.

The electronic apparatus may be a battery powered device, a mobile device, a smart watch or a near field communication, NFC, device, for example a secured NFC device.

According to a fourth aspect of the present disclosure, there is provided a method of managing electrical power consumption, comprising: controlling a voltage regulator to cyclically supply electrical current to charge a capacitor; and using a finite state machine to control the duration of a first time period of a cycle over which the voltage regulator supplies current to charge the capacitor and to control the duration of a second time period of the cycle over which the voltage regulator does not supply current to charge the capacitor and during which the capacitor discharges to supply current to an electrical circuit.

Features of the first aspect may also be, or give rise to, counterpart features for the fourth aspect.

Embodiments of the invention will now be described in detail, by way of example only, and with reference to the accompanying drawings, in which.

Similar items in the different Figures share like reference signs unless indicated otherwise.

Figure 1:
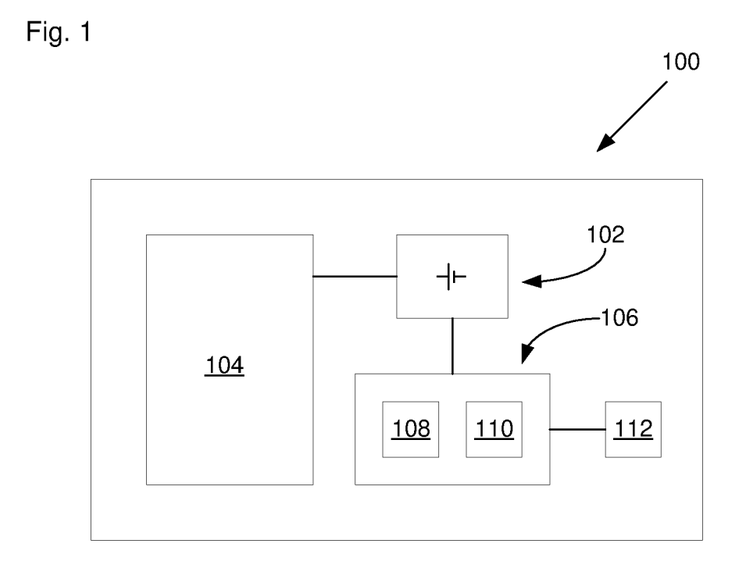
FIG. 1 shows a schematic block diagram of an example electronic device.

With reference to FIG. 1, there is shown a schematic block diagram of an electronic device 100. The electronic device may take a number of forms. For example, the electronic device may be an NFC device having a standby mode of operation. In particular, the device 100 may be a secured NFC device which spends the majority of its time in low power mode and enters the high power mode only during NFC transactions, such as payment or ticketing for example. In other embodiments, the electronic device may be a battery powered electronic device. Other embodiments of the device may provide a mobile electronic device. Another embodiment of the electronic device may be a watch and in particular a smart watch or similar.

As illustrated in FIG. 1, the electronic device 100 has a power supply or source of electrical power 102. The source of electrical power 102 may be in the form of one or more batteries. The electronic device 100 may include primary electronic circuitry 104 which provides the majority of the operational functions of the electronic device 100. As schematically illustrated in FIG. 1, the primary circuitry 104 derives electrical power from the power source 102. The primary circuitry 104 may include analog and/or digital circuitry and may include various integrated circuits, for example. The primary circuitry 104 includes all those parts of the electronic device which do not need to receive electrical power during a lower power mode of operation of the electrical device 100, such as a sleep mode for, example.

The electronic device 100 may also include power management circuitry 106 which may also be connected to the source of electrical power 102. The power management circuitry 106 is connected to one or more analog electrical components or circuits 108 which should be supplied with electrical power in the lower power mode of operation of the electrical device 100. Similarly, the power management circuitry 106 may also be connected to one or more digital electronic components or circuits 110 which should also be supplied with electrical power during the low power mode of operation of the electronic device 100. Power management circuitry 106 is also connected to one or more capacitors 112 which may be charged by power management circuitry 106 to store electrical power and supply electrical power to the analog 106 and/or digital 108 components.

As illustrated in FIG. 1, the analog electronic components 108 and the digital electronic components 110 which are supplied with electrical power during the low power mode of operation of the device 100 may be provided as an integral power of the power management circuitry 106, for example as part of the same integrated circuit. However, in other embodiments some or all of the analog components or circuitry 108 and/or some or all of the digital components or circuitry 110 may be provided separately to the power management circuitry 106, for example as separate integrated circuits.

Similarly, the one or more storage capacitors 112 illustrated in FIG. 1 may also be provided as part of the power management circuitry 106 in other embodiments.

In order to avoid significant power consumption, the electronic device 100 may switch between a higher power mode, for example a fully operating mode, and the lower power mode, for example a sleep or standby mode, in order to reduce consumption of power from the source of electrical power 102. However, even in the standby or sleep mode of the electronic device 100, some of the electronics may still need to consume electrical power in order to operate, for example in order to switch the electronic apparatus back from standby to an awake mode of operation. Power management circuitry 106 may help to reduce electrical power consumption by the electronic equipment 100 during the low power mode of operation.

Figure 2:
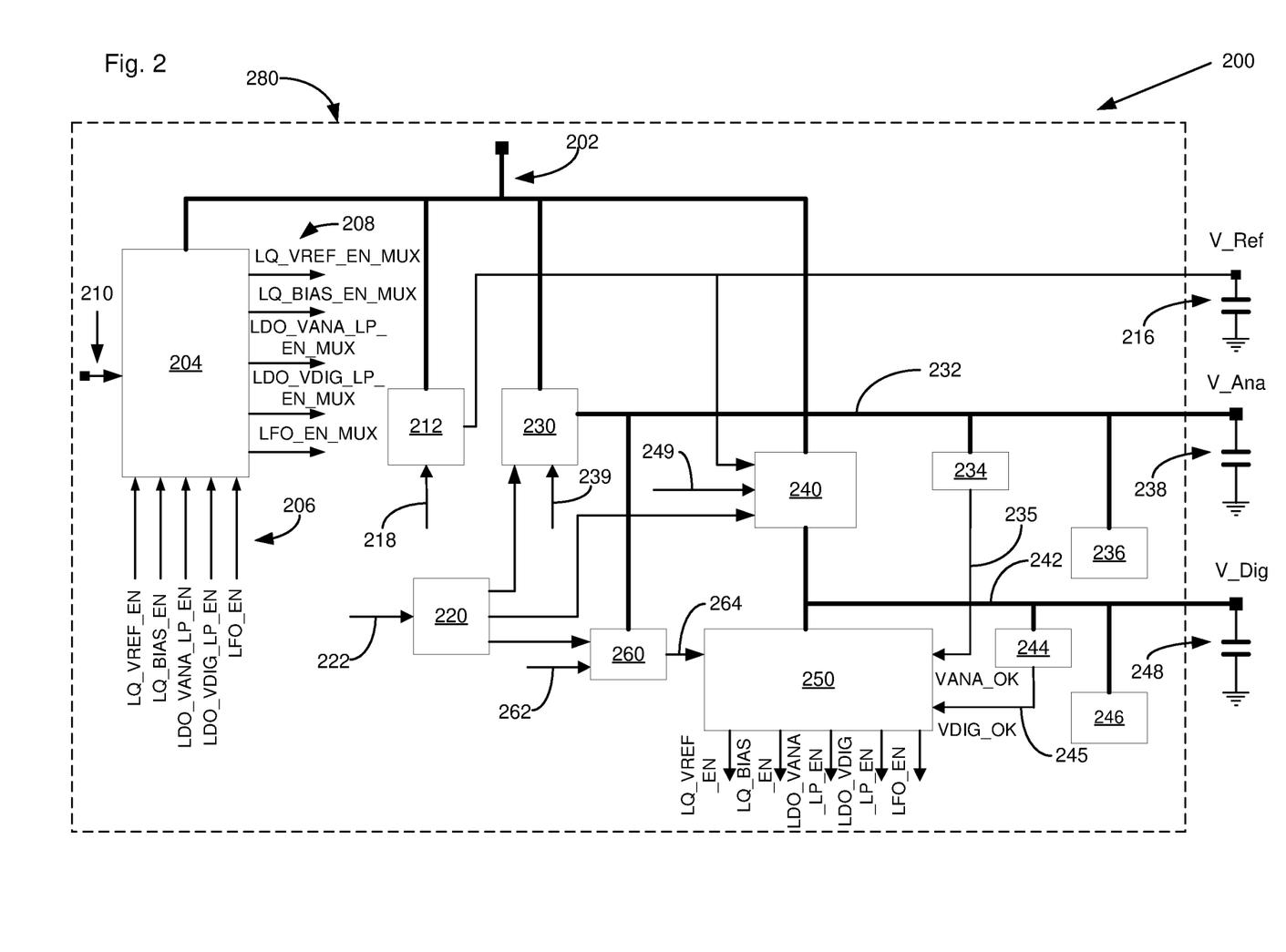
FIG. 2 shows a schematic block diagram of power management circuitry that may be used in the electronic device illustrated in FIG. 1.

With reference to FIG. 2, there is shown a schematic block diagram of power management circuitry 200 generally corresponding to power management circuitry 106, analog components 108 and digital components 110 of FIG. 1.

Power management circuitry 200 includes a power supply connection 202 which is connectable to the power supply 102. Power supply connection 202 supplies electrical power to a number of the parts of power management circuit 200, as illustrated in FIG. 2 by power supply lines in bold. Power management circuit 200 includes a controller 204 having a plurality of inputs 206 for receiving signals from other components of the circuitry and also has a plurality of outputs 208 for supplying signals to other components of the circuitry. The controller 204 also has an input 210 for receiving an external wake-up event signal. Generally speaking, the controller 204 may be provided by analog circuitry and is configured to manage the power up sequence of the power management circuitry on receipt of a wake-up event signal. The controller 204 is also configured to multiplex an enable signal used during analog control (during the power up) with an enable signal from a finite state machine, once the finite state machine is enabled and ready to control the power management circuitry.

Power management circuitry 200 further includes a voltage reference circuit 212 which can receive electrical power from the power supply and generates and outputs a reference voltage signal to a first capacitor 216 which can be charged to a reference voltage level V_ref. Voltage reference circuit 212 receives on input 218 a voltage reference enable signal from the controller 204 which can be asserted and de-asserted to switch the state of the output of the voltage reference circuit 212.

Power management circuits 200 also includes a bias current circuit 220 configured to output a bias current to a number of other parts of the circuitry. Bias current circuit 220 provides as its output a current reference used by various analog circuits of the power management circuit 200. Bias current circuit 220 has an input 222 arranged to receive a bias current enable signal from controller 204 which may be asserted and de-asserted to switch the output of the bias current circuit 220.

Power management circuitry 200 also includes a first low power voltage regulator circuit 230 and a second low power voltage regulator circuit 240. First voltage regulator 230 receives the output of the bias current circuit 220 as an input, and also has a power supply input. First voltage regulator circuit 230 is arranged to output a regulated voltage level for analog components on an analog voltage output line 232. analog voltage output line 232 is also connected to an analog voltage monitor 234 and also to any low power analog electrical components 236 generally corresponding to analog components 108. analog voltage output line 232 is also connected to a second capacitor 238 which can be charged to an analog voltage reference level V_ana. analog power regulator 230 also has an input 239 arranged to receive an analog voltage low power regulation enable signal from controller 204 and which may be asserted and de-asserted to switch the output of the regulator 230.

The second power regulator 240 is arranged to receive as inputs the output of the voltage reference circuit 212 and of the bias current circuit 220. Second regulator 240 is connected to the power supply and outputs a regulated digital voltage on second output line 242. A digital voltage monitor 244 is connected to the digital voltage output line 242 and digital electronic components requiring a low power supply 246, corresponding to 110 in FIG. 1, are also connected to the digital voltage output line 242. A third capacitor 248 is also connected to the digital voltage output line 242 and can be charged to a reference digital voltage level V_dig. Digital voltage regulator 240 also has an input 249 arranged to receive a digital voltage regulator enable signal from the controller 204 and which may be asserted and de-asserted to switch the output of the digital voltage regulator 240.

First 216, second 238 and third 248 storage capacitors of FIG. 2 correspond generally to the one or more storage capacitors 112 as illustrated in FIG. 1.

Analog voltage monitor 234 has an output 235 indicating that the analog voltage level is acceptable or not. Similarly, digital voltage monitor 244 has an output 245 indicating whether the digital voltage level is acceptable or not.

Power management circuitry 200 also includes a finite state machine 250. Finite state machine 250 may be implemented as a digital electrical circuit. Finite state machine 250 receives a digital voltage as a power input from digital voltage regulator 240. Finite state machine circuit 250 includes four outputs 252 supplying various signals, described in greater detail below, as inputs to analog controller 204. In some embodiments, finite state machine circuitry 250 may also receive the analog voltage level status indication from output 235 and the digital voltage level status indication from output 245.

Power management circuitry 200 also includes a low frequency oscillator 260 with an input 262 arranged to receive the reference current output of the bias current circuit 220 an output 264 of the low frequency oscillator 260 is supplied as an input to the finite state machine circuit 250. The low frequency oscillator 260 has a further input 266 arranged to receive a low frequency oscillator enable signal from the controller 204 and which may be asserted and de-asserted to switch the output of the low frequency oscillator.

In one embodiment, all of the parts illustrated in FIG. 2, other than the storage capacitors 216, 238 and 248, may be provided as a single semiconductor integrated circuit as indicated by broken line 280. Hence the parts of the analog circuitry which receive electrical power in the lower power mode 236 and the parts of the digital circuitry which receive electrical power in the lower power mode 246 are also provided as part of the same integrated circuit.

In other embodiments one or more of the storage capacitors 216, 238 and 248 may also be provided as part of the integrated circuit together with the power management circuitry 200.

As described in greater detail below, the finite state machine 250 is used to manage the cycle of the power management carried out by the power management circuitry 200. A first voltage based mode of operation will be described below and a second timing based mode of operation. The low frequency oscillator 260 provides a timing signal which defines the timing units used by the system. The controller 204 manages the circuitry on receipt of a wake-up event to start the low power mode of operation of the power management circuitry and the multiplexing between the wake-up event of the low power mode and the finite state machine control signal.

Figure 3:
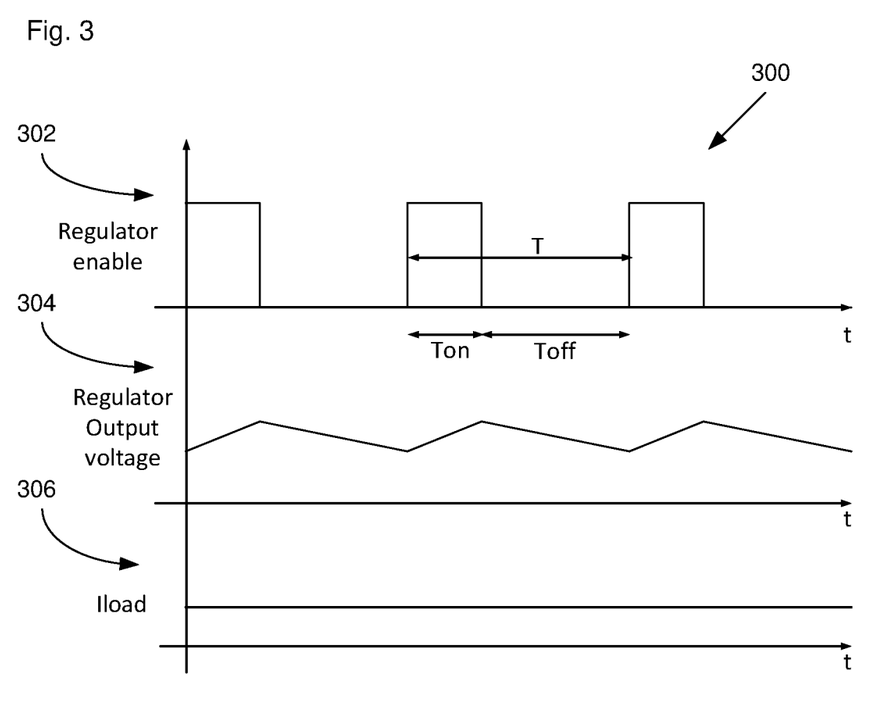
FIG. 3 shows a timing diagram illustrating operation of the power management circuitry shown in FIG. 1.

Before describing operation of the power management circuitry 200 in detail, the principal of the method of the operation of the power circuitry will be described with particular reference to FIG. 3. A first portion 302 of the timing diagram shows the level of a regulator enable signal as a function of time. A second portion 304 of the timing diagram 300 shows the level of the output voltage of the regulator as a function of time. A third portion 306 shows the current drawn by the load connected to the output of the voltage regulator as a function of time. As illustrated in FIG. 3, the load applied to the voltage regulator causes a substantially constant current. As will be appreciated by a person of ordinary skill in the art, the discussion of FIG. 3 applies equally to the behaviour of the analog voltage regulator 230 as well as the digital voltage regulator 240.

As can be seen, the regulator enable signal has a period of duration T. During an initial portion, or first part, of that period the regulator enable signal is high for a time Ton and then during a subsequent, of second part, of that period, the regulator enable signal is low for a time Toff, and with the duration of the period T being Ton+Toff. Hence, when the voltage regulator enable signal output by the controller 204 for either the analog voltage regulator 230 or digital voltage regulator 240 is high, then the current output by the voltage regulator is used to charge the respective capacitor attached to the power output line 232, 242.

Hence, as illustrated in FIG. 3, during the time Ton the level of the voltage of the capacitor attached to the output line increases. When the voltage regulator enable signal is de-asserted, during the time Toff, then the voltage of the storage capacitor decreases as electrical power is consumed by the electrical components connected to the storage capacitor, e.g. analog components 236 connected to analog voltage storage capacitor 238 or digital components 246 connected to the digital voltage storage capacitor 248. Hence, by controlling the portion of a cycle, T, over which the storage capacitors are charged, Ton, then the overall power consumption can be decreased by a factor of Ton over T compared to a mode of operation in which storage capacitors are constantly charged.

The duration Ton may be programmable through registers of the finite state machine 250 and defined by a number of low frequency oscillator clock cycles as read by finite state machine 250 from the output of local low frequency oscillator 260. The duration of Toff may be set using two different approaches. In a first timing based approach, the duration of Toff may also be programmable through registers in the finite state machine 250 and again defined by a number of low frequency oscillator clock cycles. In an alternative mode of operation, the duration of Toff may be set by monitoring the voltage of the storage capacitors using the analog voltage monitor circuit 234 and digital voltage monitor circuit 244 respectively.

By managing the proportion of the period T over which current is supplied to charge the storage capacitors significant electrical power consumption savings can be made. The power consumption saving may be expressed using the following formula:

$$I_{TOT} = I_{LOAD} + I_Q \times \frac{T_{on}}{T} + I_{Q\_AO}$$

in which:

$I_{TOT}$: is the total current consumption in the low power mode;

$I_{LOAD}$: is the load current of the analog 236 and digital 246 circuits;

$I_Q$: is the quiescent current of modules cycled during $T_{on}$;

$I_{Q\_AO}$: is the quiescent current of modules always on during voltage or timing mode;

$T_{on}$: is the duration of the turn on time duration of modules cycled during voltage or timing mode; and T: is the period of the voltage or timing mode cycle.

Hence, the overall power consumption can be decreased by a factor Ton/T. In the event that the analog circuits 236 and/or digital circuits 246 consume electrical power even in the sleep state of the electronic apparatus then more current will be saved using the voltage monitoring mode of operation compared to the purely timing based mode of operation.

Figure 4:
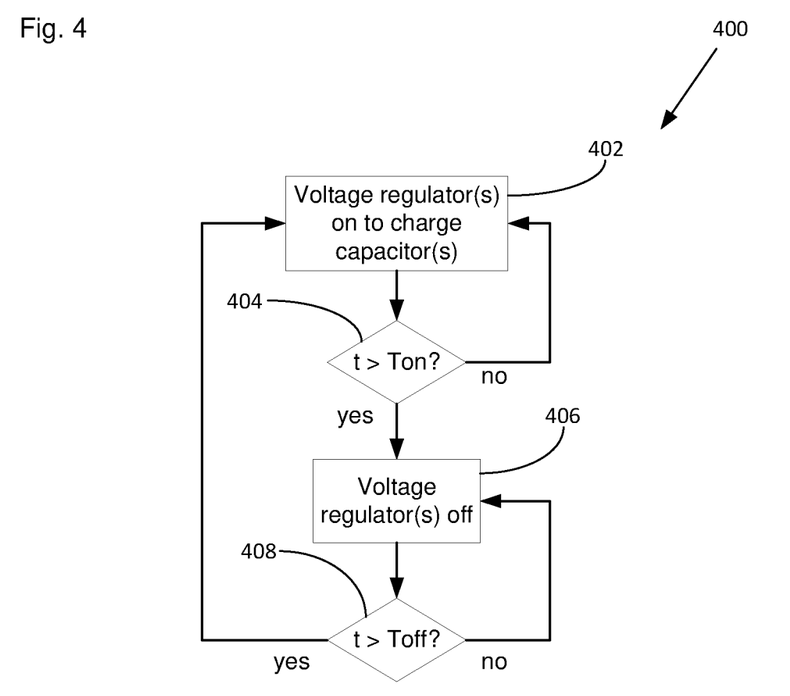
FIG. 4 shows a flow chart illustrating a first method of operation of the circuitry shown in FIG. 2.
Figure 5:
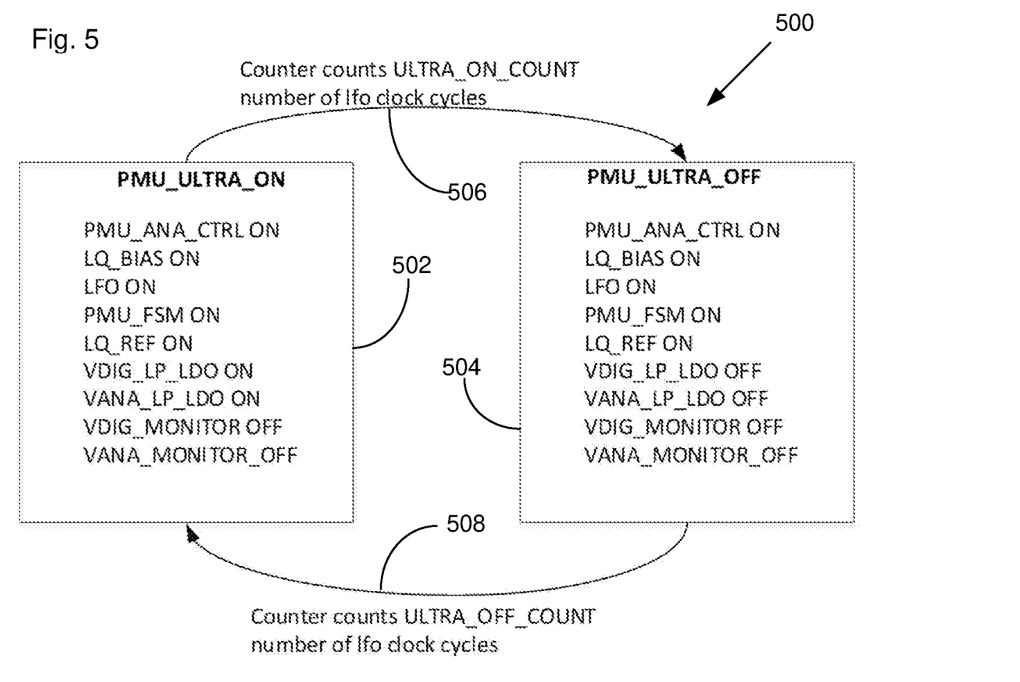
FIG. 5 shows a finite state machine diagram illustrating a first example of a finite state machine that may be used in the circuitry shown in FIG. 2 and the method illustrated by FIG. 4.

With reference to FIG. 4, there is shown a process flow chart illustrating a purely timing based method of operation of the power management circuitry illustrated in FIG. 2. The power management circuitry 200 uses a combination of linear power management with a finite state machine to reduce power consumption by managing the portion of a cycle during which the storage capacitors are charged. FIG. 5 shows a graphical representation of a finite state machine 500 as implemented by finite state machine circuitry 250. As will be understood by a person of ordinary skill in the art, finite state machines can be represented by states having related actions and transitions between states with associated transition conditions. As illustrated in FIG. 5, finite state machine 500 has a first on state 502, and a second off state 504. The finite state machine may transition from the on state 502 to the off state 504 via transition 506 on the condition of expiry of the duration of the turn on period Ton illustrated in FIG. 3. Similarly, finite state machine 500 may transition between the off state 504 and the on state 502 via transition 508 on a transition condition of expiry of the duration of the Toff period illustrated in FIG. 3.

As also illustrated in FIG. 5, during the on state, 502, the finite state machine sets the logic status of the digital voltage regulator 240 as on and also the analog voltage regulator 230 as on. Corresponding regulator enable signals are output by finite state machine circuitry 250 to controller 204 which supplies corresponding control signals to the analog voltage regulator 230 via signal 239 and digital voltage regulator 240 via signal 249. Hence, at the start of the Ton period, the digital voltage regulator and analog voltage regulator enable signals are set high and the analog voltage regulator and digital voltage regulator output current to charge the analog voltage storage capacitor 238 and digital voltage storage capacitor 248 respectively. Hence, at 402, during the on period Ton, the voltage regulators operate to charge the storage capacitors. During period Ton, the finite state machine circuitry 250 receives the low frequency oscillator signal on line 264 and counts the number of low frequency oscillator clock cycles and compares the count of low frequency oscillator clock cycles to a value stored in a register. When the number of low frequency oscillator clock cycles reaches the register value, expiry of the period Ton is determined and hence at 404, time period Ton is determined to expire. Hence, the finite state machine 500 transitions to the off state 504.

In state 504, the digital voltage regulator and analog voltage regulator states are set to off and a corresponding signal is output by finite state machine circuitry 250 to controller 204 which de-asserts enabling signals to the analog voltage regulator 230 and digital voltage regulator 240 which cease operation and stop outputting current to charge the respective storage capacitors at 406. Hence, at 406, current is no longer supplied to the storage capacitors by the voltage regulator circuits. The finite state machine starts another count of the number of low frequency oscillator clock cycles and compares that count with a further value set in a register to determine when the Toff period has expired. During the time Toff, the low power analog components 236 and/or digital components 246 requiring power can receive power by discharge of the analog storage capacitor 238 or digital storage capacitor 248 respectively.

The finite state machine 250 continues counting the low frequency oscillator clock cycles until it determines at 408 that the time period Toff has expired. On expiry of Toff, the finite state machine transitions from the off state 504 to the on state 502 at which the logic levels of the digital voltage regulator and analog voltage regulator are set high and corresponding regulator enable signals are output to controller 204 which can then assert enable signals to cause the analog voltage regulator and digital voltage regulator to restart supplying current to the storage capacitors for the duration of Ton. Hence, operation of the circuit repeats with the finite state machine periodically turning on the voltage regulators to charge the storage capacitors and then turning voltage regulators off.

Figure 6:
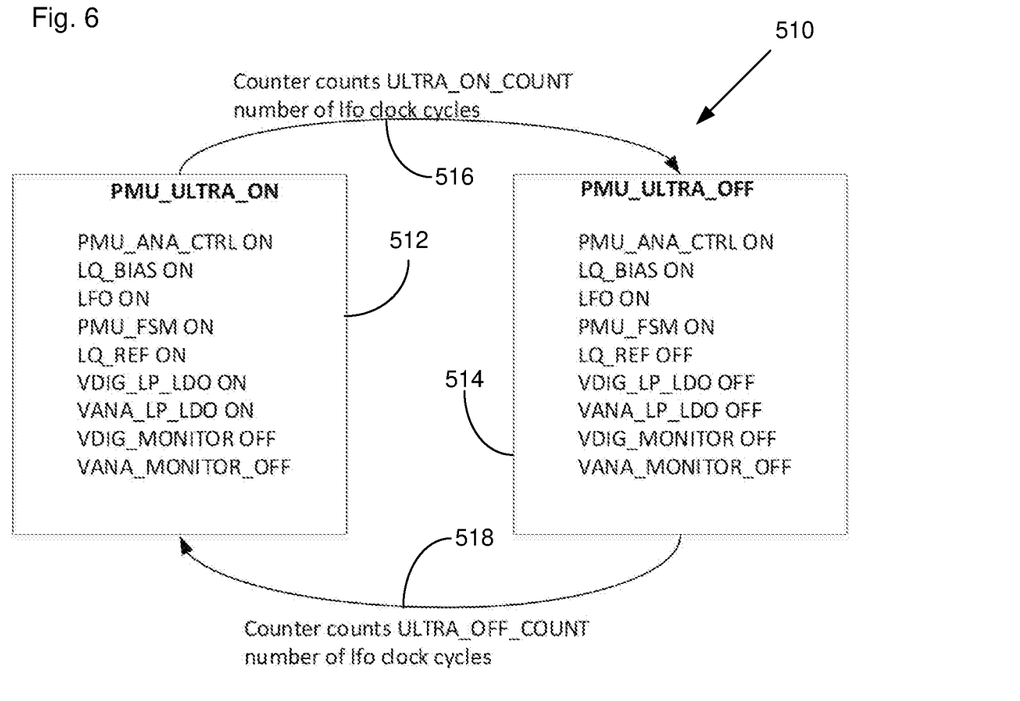
FIG. 6 shows a finite state machine diagram illustrating a second example of a finite state machine that may be used in the circuitry shown in FIG. 2 and the method illustrated by FIG. 4.

FIG. 6 shows a further finite state machine 510 similar to finite state machine which may also be implemented by finite state machine circuitry 250. Finite state machine 510 operates generally similarly to finite state machine 500 and again has an on state 512 and an off state 514 and a transition from the on state to the off-state 516 and from the off stet to the on state 518. Similarly, a purely timed based mode of operation is provided in which the number of low frequency oscillator clock signals is counted and compare the register values in order to determine the duration of the time periods Ton and Toff. However, in the finite state machine 510, in the off-state, the finite state machine also changes the state of a voltage reference enable signal from high to low and outputs a corresponding control signal to analog controller 204.

Hence, during the off, non-charging state, the analog control circuit 204 also turns off the voltage reference circuit 212 to stop charging the reference voltage storage capacitor 216. Hence, as well as cycling the charging of the analog voltage and digital voltage storage capacitors, the power management circuit may also cycle the charging of the reference voltage storage capacitor 216. Hence, as a purely timing based approach to controlling the charging cycle is adopted, the analog voltage monitor circuit 234 and the digital voltage monitor circuit 244 may be omitted.

Figure 7:
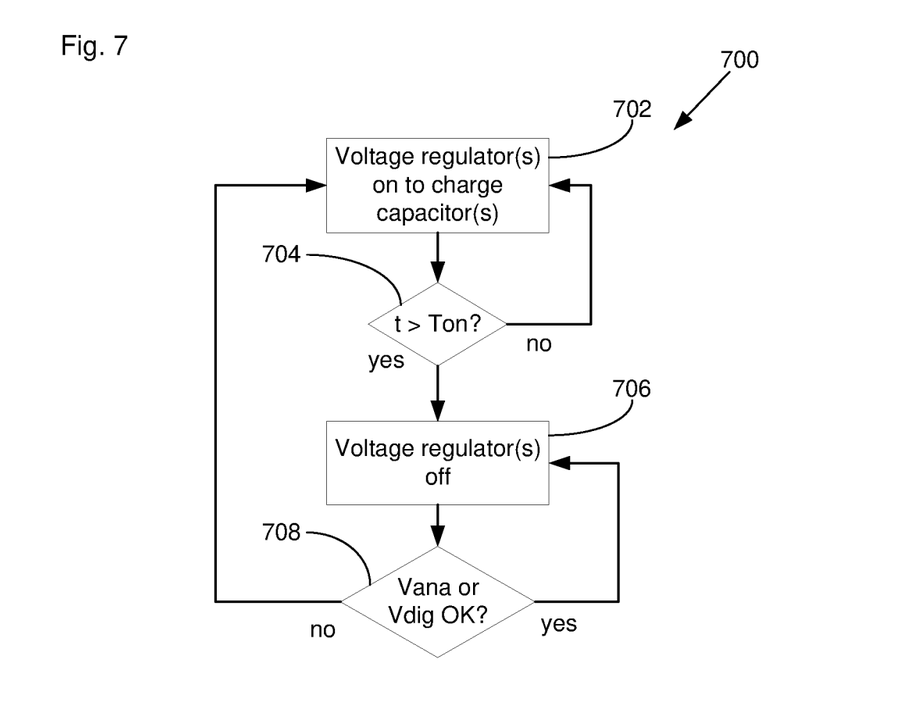
FIG. 7 shows a flow chart illustrating a second method of operation of the circuitry shown in FIG. 2.

FIG. 7 shows a flow chart illustrating a voltage detection mode of operation of the power management circuitry 200. Similarly to the purely time-based method of operation, a finite state machine is used to manage the proportion of the timing cycle during which the storage capacitors are charged and not charged by the voltage regulator circuits.

Figure 8:
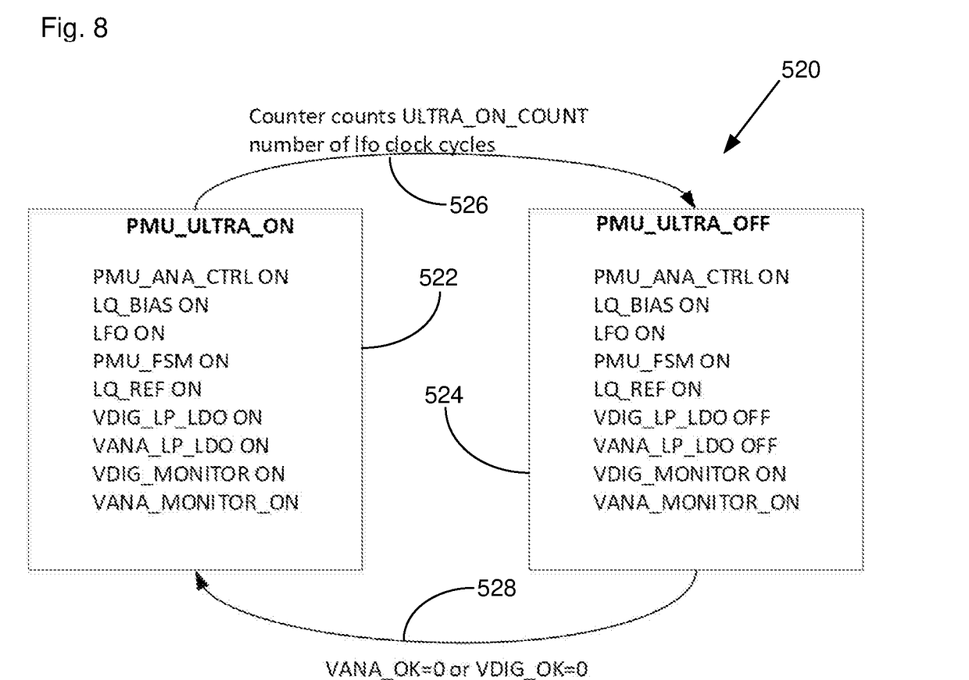
FIG. 8 shows a finite state machine diagram illustrating a third example of a finite state machine that may be used in the circuitry shown in FIG. 2 and the method illustrated by FIG. 7.

FIG. 8 shows a graphical representation of a finite state machine 520 implemented by finite state machine circuit 250. Similarly to the previously described finite state machines, finite state machine 520 has an on state 522 and an off state 524. The finite state machine may transition between the on, charging state via transition 526 to the off, non-charging state 524. Finite state machine 520 may also transition between the off, non-charging state 524 and the on, charging state 522 via transition 528. Similarly to finite state machines 500 and 510, the transition condition for transitioning from the on, charging state to the off, non-charging state is the number of low frequency oscillator clock cycles reaching a value stored in a register of the finite state machine. However, differently to the previous examples, the transition condition for transitioning from the off, non-charging state to the on, charging state is a determination that the voltage level of the analog voltage storage capacitor 238 or digital voltage storage capacitor 248 has fallen below some threshold value.

Returning to FIG. 7, in the on, charging state 522, the analog controller 204 asserts control signals to enable the analog voltage regulator 230 and digital voltage regulator 240 to output current to charge the analog voltage storage capacitor 238 and digital voltage storage capacitor 248 respectively at 702. The regulators continue to output current for the duration of the time period Ton at 702. When the finite state machine determines at 704, based on a count of the number of local frequency oscillator clock cycles compared to a value stored in the register that the time period Ton has expired then the finite state machine transitions from the on, charging state 522 to the off, non-charging state 524 corresponding to step 706 of method 700. The logic values of the digital voltage regulator enable signal and analog voltage regulator enable signal are set low and corresponding signals are output by finite state machine circuitry 250 to controller 204 which disables the analog voltage regulator 230 and digital voltage regulator 240 to stop charging the capacitors at 706.

Analog voltage monitor circuit 234 and digital voltage monitor circuit 244 monitor the level of the voltage on the analog voltage storage capacitor 238 and digital voltage storage capacitor 248 respectively. If either the analog voltage monitor circuit 234 or the digital voltage monitor circuit 244 determines that the measured storage voltage level falls below a threshold value, then an output signal on line 235 or 245 changes state and is received by the finite state machine circuitry 250.

Hence, if it is determined at 708 that the analog voltage level or the digital voltage level has fallen below a threshold value then the finite state machine transitions from the off, non-charging state 524 to the on, charging state 522. Again, the finite state machine sets an analog voltage regulator enable signal and a digital voltage regulator enable signal high and outputs signals to the analog controller 204 which enables the analog voltage regulator 230 and the digital voltage regulator 240 which start supplying current to recharge the analog voltage storage capacitor 238 and digital voltage storage capacitor 248 again at 702.

Hence, the power management circuitry operates to charge the storage capacitors for a time period Ton set by register values in the finite state machine. However, the duration of the period Toff is adaptive and is determined by the voltage level of the storage capacitors. Hence, in circumstances in which either of the storage capacitors discharges more rapidly, then Toff may be shorter, whereas in circumstances in which the storage capacitors do not discharge as quickly, because there is lower consumption by analog circuitry 236 or digital circuitry 246, then Toff may have a greater duration.

Figure 9:
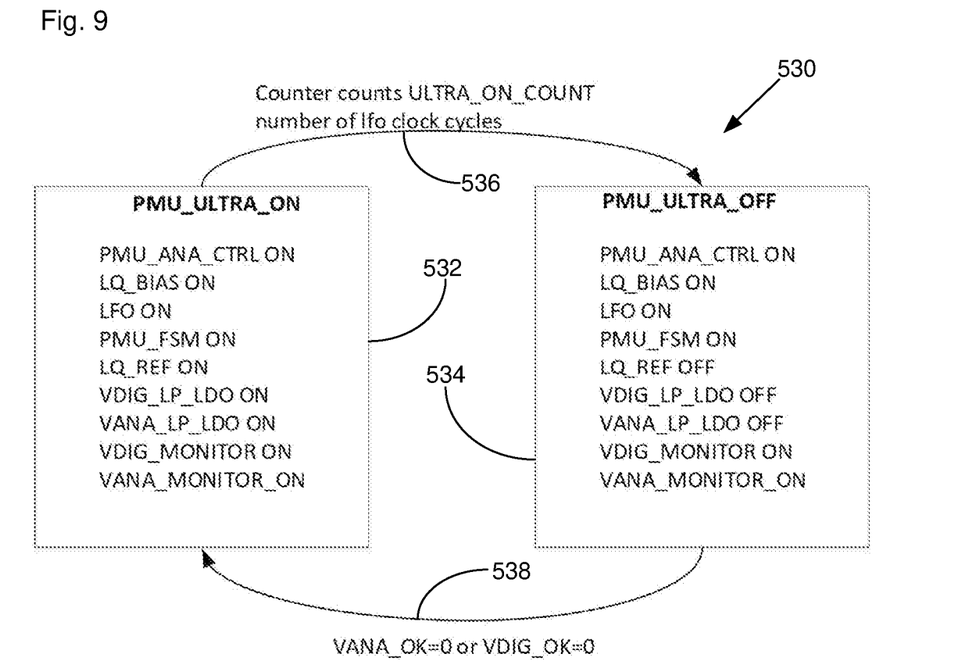
FIG. 9 shows a finite state machine diagram illustrating a second example of a finite state machine that may be used in the circuitry shown in FIG. 2 and the method illustrated by FIG. 7.

FIG. 9 shows a graphical representation of a further finite state machine 530 similar to finite state machine 520. Again, finite state machine 530 has an on state 532, off state 534 and a transition from the on state to the off state 536 with transition condition of the number of clock cycles meeting a stored register value. Similarly, the transition from the off, non-charging state 534 to the on, charging state 532 via transition 538 has transition condition of either storage capacitor voltage falling below a threshold value.

Similarly to finite state machine 510 illustrated in FIG. 6, finite state machine 530 also provides reference voltage cycling by turning off reference voltage 212 to stop charging reference voltage capacitor 216 during the off, non-charging state 534.

Hence, the circuitry and methods described herein are able to reduce power consumption in a low power mode of operation by enabling and disabling the low power module in a cyclical manner based on either a voltage or timing mode of operation. There is significant flexibility in the system. The duration of Ton may be programmable through registers in both voltage mode and timing mode of operation. Also, Toff may be programmable through registers in the timing mode of operation. The overall circuitry is simply to implement as it may be provided as an additional digital solution. In some embodiments, the parts of the power management circuitry 200 may be implemented as a single integrated circuit.

The circuitry and method of operation may be particularly suitable for use in NFC devices in the standby mode of operation. Other areas of application include any battery-operated electronic equipment, mobile electronic equipment and personal electronic devices in which low power consumption is particularly relevant, for example smart watches and similar In this specification, example embodiments have been presented in terms of a selected set of details. However, a person of ordinary skill in the art would understand that many other example embodiments may be practiced which include a different selected set of these details. It is intended that the following claims cover all possible example embodiments.

Any instructions and/or flowchart steps can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

While the disclosure is amenable to various modifications and alternative forms, specifics thereof have been shown by way of example in the drawings and described in detail. It should be understood, however, that other embodiments, beyond the particular embodiments described, are possible as well. All modifications, equivalents, and alternative embodiments falling within the scope of the appended claims are covered as well.

The invention claimed is:

1. A power management circuit comprising:
   an electrical power input for receiving electrical power from a power source;
   a controller configured to receive one or more enable signals, and to multiplex the one or more enable signals to control operation of the power management circuit;
   a finite state machine circuit in communication with the controller, the finite state machine circuit configured to provide the one or more enable signals to the controller; and
   a first voltage regulator in communication with the controller to receive one of the one or more multiplexed enable signals, and the first voltage regulator in communication with the electrical power input to receive electrical power and having a first output connectable to a first capacitor for storing electrical power and connectable to first electrical circuitry, wherein the controller is configured to cyclically enable the first voltage regulator with one of the one or more multiplexed enable signals to supply current to charge the first capacitor and wherein the finite state machine circuit is configured to interact with the controller to control the duration of a first time period (Ton) of a cycle over which the first voltage regulator supplies current to charge the first capacitor and to control the duration of a second time period (Toff) of the cycle over which the first voltage regulator does not supply current to charge the first capacitor and during which electrical current is receivable by said first electrical circuitry from said first capacitor.

2. The power management circuit of claim 1, and further comprising:
   a second voltage regulator in communication with the controller and the electrical power input to receive electrical power and having a second output connectable to a second capacitor for storing electrical power and connectable to second electrical circuitry, wherein the controller is configured to cyclically enable the second voltage regulator to supply current to charge the second capacitor and wherein the finite state machine circuit is configured to interact with the controller to control the duration of the first time period (Ton) of a cycle over which the second voltage regulator supplies current to charge the second capacitor and to control the duration of the second time period (Toff) of the cycle over which the second voltage regulator does not supply current to charge the second capacitor and during which electrical current is receivable by said second electrical circuitry from said second capacitor.

3. The power management circuit of claim 2, wherein said first capacitor stores electrical power and is arranged to supply electrical power for powering analog electrical components and wherein said second capacitor stores electrical power and is arranged to supply electrical power for powering digital electrical components.

4. The power management circuit of claim 1, further comprising:
   a reference voltage circuit in communication with the controller and the electrical power input to receive electrical power and having a third output connectable to a reference voltage capacitor for storing electrical power, wherein the controller is configured to cyclically enable the reference voltage circuit to supply current to charge the reference voltage capacitor and wherein the finite state machine circuit is configured to interact with the controller to control the duration of the first time period (Ton) of a cycle over which the reference voltage circuit supplies current to charge the reference voltage capacitor and to control the duration of the second time period (Toff) of the cycle over which the reference voltage circuit does not supply current to charge the reference voltage capacitor.

5. The power management circuit of claim 1 further comprising a low frequency oscillator in communication with the controller and the finite state machine circuit, and wherein the finite state machine circuit is configured to control the duration of the first time period (Ton) based on the number of cycles of the low frequency oscillator.

6. The power management circuit of claim 5, wherein the finite state machine circuit includes a first programmable register and wherein a value set in the first programmable register is used to determine the duration of the first time period (Ton).

7. The power management circuit of claim 5, wherein the finite state machine circuit is further configured to control the duration of the second time period (Toff) based on the number of cycles of the low frequency oscillator.

8. The power management circuit of claim 7, wherein the finite state machine circuit includes a second programmable register and wherein a value set in the second programmable register is used to set the duration of the second time period (Toff).

9. The power management circuit of claim 1, further comprising:
a first voltage monitor in communication with the first output and the finite state machine circuit, wherein the first voltage monitor is configured to output a first indication of the voltage of the first capacitor and wherein the finite state machine circuit is further configured to control the duration of the second time period (Toff) based on the first indication of the voltage of the first capacitor.

10. The power management circuit of claim 9 further comprising:
a second voltage monitor in communication with the second output and the finite state machine, and wherein the second voltage monitor is configured to output a second indication of the voltage of the second capacitor and wherein the finite state machine circuit is further configured to control the duration of the second time period (Toff) based on the second indication of the voltage of the second capacitor.

11. The power management circuit of claim 10, wherein the finite state machine circuit is further configured to control the duration of the second time period (Toff) based on the first indication indicating that the voltage of the first capacitor has fallen below a threshold level or the second indication indicating that the voltage of the second capacitor has fallen below a threshold level.

12. A package including a semiconductor integrated circuit, wherein the semiconductor integrated circuit is configured to include the power management circuit of claim 1.

13. The power management circuit as claimed in claim 1, wherein the power management circuit is part of a secured near field communication device.

14. A method of managing electrical power consumption, comprising:
using a controller and finite state machine to cause a voltage regulator to cyclically supply electrical current to charge a capacitor, wherein the
finite state machine is configured to provide one or more enable signals to the controller, and the controller multiplexes the one or more enable signals control a duration of a first time period (Ton) of a cycle over which the voltage regulator supplies current to charge the capacitor and to control a duration of a second time period (Toff) of the cycle over which the voltage regulator does not supply current to charge the capacitor and during which the capacitor discharges to supply current to an electrical circuit.

* * * * *